United States Patent Office 3,723,147
Patented Mar. 27, 1973

3,723,147
STABILIZER SYSTEM FOR CELLULOSE ESTER PLASTICS
Edwin L. Wood, Kingsport, and Roger E. Gibson, Jonesboro, Tenn., assignors to Eastman Kodak Company, Rochester, N.Y.
No Drawing. Continuation-in-part of application Ser. No. 878,923, Nov. 21, 1969. This application Nov. 3, 1971, Ser. No. 195,446
Int. Cl. C08b 27/62
U.S. Cl. 106—176        2 Claims

ABSTRACT OF THE DISCLOSURE

Cellulose ester plastics useful as moldings, sheets, films, and other formed articles, of cellulose acetate, cellulose butyrate, cellulose propionate, and co-esters thereof, have markedly improved heat stability in regard to color and inherent viscosity when stabilized with combinations of certain sulfides, particularly di-tridecyl-3,3'-thiodipropionate, and certain epoxides, particularly resorcinol bis-glycidyl ether, each in a concentration of from about 0.01 to about 10.0 parts by weight per 100 parts by weight of the cellulose ester.

---

This is a continuation-in-part application of U.S. Ser. No. 878,923, filed Nov. 21, 1969, now abandoned.

This invention relates to cellulose ester plastic materials which are useful as molded or otherwise formed articles, sheets, films and the like, and which exhibit markedly improved resistance to coloring and reduction in inherent viscosity when subjected to rigorous degradation conditions such as encountered in injection molding or calendering.

Cellulose ester plastics conventionally employed for the aforementioned uses are cellulose acetate, cellulose butyrate and cellulose propionate. As is commonly known, these plastics are not employed in their completely esterified state but are actually back hydrolyzed to reduce the degree of esterification and increase their plasticizability. For example, the actual acetyl content of cellulose acetate would range from about 38 to about 41 percent by weight for most applications, although more or less acetylation could be employed. Both higher and lower degrees of esterification reduce the plasticizability (compatibility) and result in embrittlement and loss of good physical properties. Excessive back hydrolysis, of course, produces a gelled material. Also, as is well known, the cellulose butyrate and cellulose propionate esters contain minor proportions of acetyl groups. For example, commercial cellulose butyrates would be expected to contain from about 35 to about 50 percent butyryl, and the remainder acetyl. Likewise, commercial cellulose propionates would be expected to contain from about 39 to about 48 percent propionyl, and the remainder acetyl. The addition of acetyl to these plastics gives improved plasticizer compatibility and physical properties. Therefore, in this application, the term cellulose esters is intended to mean those plastics of cellulose acetate, butyrate, and propionate which are commonly employed in their plasticized condition for the aforesaid purposes.

Commercial cellulose esters in the past have not attained their optimum usefulness because of the inadequacies of the stabilizer systems which have not solved the color and inherent viscosity (I.V.) reduction problems resulting from such commercial operations as melt extrusion in large scale extrusion apparatus. In such operations the extruded plastic takes on a yellow cast and the I.V. drops. The yellowing phenomenon is objectionable in many applications such as clear, adhesive, pressure sensitive tapes. The reduction in I.V. results in poor performance in regard to mechanical properties such as tensile strength and impact strength.

Objects, therefore, of the present invention are to provide cellulose ester plastics with improved color stability while maintaining desirable inherent viscosity (I.V.) levels; to provde a cellulose ester plastic useful for the manufacture of film, sheet and molded objects having improved color stability and good physical properties; and to provide an effective stabilizer system for attaining the improved color and I.V. retention.

These and other objects hereinafter appearing have been attained in accordance with the present invention through the discovery that the combination of certain organic sulfides and epoxides are highly effective in stabilizing cellulose ester plastics against heat discoloration and loss of inherent viscosity during such operations as injection molding, melt extrusion, calendering and the like.

The sulfides useful in the present invention are represented by the following general formulas:

(A)    $ROOCCH_2CH_2-S-CH_2CH_2COOR$
(B)    $R-SCH_2CH_2-SO_2-CH_2CH_2-SR$

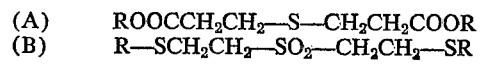

wherein R is straight or branched chain alkyl of 8 to 22 carbon atoms. Among the sulfides coming within these general formulas are di-tridecyl-3,3'-thiodipropionate, dilauryl - 3,3' - thiodipropionate, dimyristyl-3,3'-thiodipropionate, and distearyl-3,3'-thiodipropionate.

The epoxides useful in the present invention are represented by the general formula

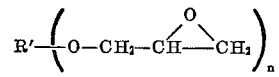

wherein $n$ is 1, 2, 3, or 4, and R' is straight or branched chain alkyl of 1 to 22 carbons, phenyl, or straight or branched chain alkyl substituted phenyl wherein the alkyl substitution replaces up to three ring hydrogens and each alkyl group contains from 1 to 20 carbons, and alkyl esters of epoxidized alkenoic acids wherein the alkyl portion contains from 1 to 12 carbons and the acid portion contains from 4 to 22 carbons. Such epoxides include resorcinol bis-glycidyl ether, epoxidized soybean oil, epoxidized alkyl tallates, and epoxidized oleate esters.

The sulfide component is useful in the range of from about 0.01 to about 5.0 parts by weight per hundred parts by weight of cellulose ester, and the epoxide from about 0.01 to about 10.0 parts by weight per hundred parts by weight of cellulose ester. The sulfide and epoxide components are each preferred in the 0.01 to about 1.0 parts by weight range per 100 parts by weight of cellulose ester, and most preferred is the 0.1 to about 1.0 parts by weight range. The most preferred combination of sulfide and epoxy components is di-tridecyl-3,3'-thiodipropionate, commercially available as Plastanox 711, and resorcinol bis-glycidyl ether, commercially available as Kopox ERE 1359. In addition to these stabilizers, any of the common additives, including plasticizers, fillers, anti-oxidants, and ultraviolet inhibitors may be included in the plastic formulation.

In the following examples, E-400-25 is cellulose acetate having approximately 40 percent by weight acetyl (ASTM D871) and 25 seconds viscosity (ASTM D1343), EAP-482-20 is cellulose acetate propionate having approximately 48 percent by weight propionyl (ASTM D871) and 20 seconds viscosity (ASTM D1343). This material may contain 0.025 percent potassium acid citrate which has no discernable relevance to the present invention.

EXAMPLE 1

Two thousand grams of E-400-25, 451 g. diethyl phthalate, 10 g. resorcinol bis-glycidyl ether and 10 g. Uvi-nox 4200 (organic sulfide of Formula B above where R is tert-dodecyl) were mixed, rolled and granulated. A compression molded sheet gave a Gardner color difference meter (CDM) "b" reading (indicates yellowing, the lower the number indicating the lower the level of color) of 12.3. A control sample using the stabilizer 0.25% resorcinol bis-glycidyl ether and 0.5% para-tertiary butyl phenol in 100 g. of E–400–25 blended with 22.5 g. of diethyl phthalate and a "b" heading of 12.0. The two samples were extruded four times, compression molded into a sheet and "b" readings taken as follows:

Two hundred grams of E–400–25, 45 g. diethyl phthalate, 0.5 g. Drapex 4.4 (epoxidized octyl tallate), and 1.0 g. Uvi-nox 4200 were mixed for 10 minutes in a Brabender Plasti-corder. The color difference meter "b" reading was Standard formulation—(1) 18.2, (2) 23.6, (3) 27.2, (4) 29.6

Uvi-nox 4200 formulation—(1) 16.0, (2) 19.4, (3) 23.0, (4) 24.7

EXAMPLE 2 ing was 14.2. The control sample of Example 1 had a "b" reading of 24.4 after the Brabender Plasti-corder treatment.

EXAMPLE 3

Two hundred grams of E–400–25, 45 g. diethyl phthalate, 0.5 g. resorcinol bis-glycidyl ether and 1.0 g. Uvi-nox 4200 were mixed for 10 minutes in the Brabender Plasti-corder. The "b" reading was 11.8. The control sample of Example 1 has a "b" reading of 24.4 after the Brabender Plasti-corder treatment.

EXAMPLE 4

Two thousand grams of EAP–482–20, 360 g. di-2-ethylhexyl phthalate, 20 g. Drapex 4.4, 2.9 g. nonyl phenyl phosphite, 0.4 g. Carstab SN (strontium naphthenate) and 20 g. Plastanox 711 (di-tridecyl-3,3'-thiodipropionate, type "A" structure) were mixed, compounded on a roll and granulated. A test piece was obtained from the transfer mold and had a CDM "b" reading of 10.3. The same formulation without Plastanox 711 had a "b" reading of 10.5. Each was then extruded four times and molded into test pieces. The CDM "b" readings were as follows:

Formulation, Standard Commercial—(1) 11.8, (2) 12.9, (3) 13.8, (4) 14.8

Formulation with Plastanox 711 and Drapex 4.4 (epoxidized octyl tallate)—(1) 11.2, (2) 11.8, (3) 12.6, (4) 13.2

EXAMPLE 5

One hundred parts by weight of E–400–25, 22.5 parts by weight of diethyl phthalate and 0.3 parts by weight of Uvi-nox 4200 are mixed and fluxed in the Brabender Plasti-corder for 10 minutes. The CDM "b" reading indicating yellowness is 15.1. The I.V. is 0.63.

EXAMPLE 6

One hundred parts by weight of E–400–25, 22.5 parts by weight of diethyl phthalate, 0.25 parts by weight of resorcinol bis-glycidyl ether, and 0.05 parts by weight of para-tertiary butylphenol are mixed and fluxed for 10 minutes in the Brabender Plasti-corder. The CDM "b" reading is 24.4. The I.V. is 1.08.

EXAMPLE 7

One hundred parts by weight of E–400–25, 22.5 parts by weight of diethyl phthalate, 0.3 parts by weight of Uvi-nox 4200, and 0.25 parts by weight of resorcinol bis-glycidyl ether are mixed and fluxed on the Brabender Plasti-corder. The CDM "b" reading is 16.2. The I.V. is 1.08.

EXAMPLE 8

One hundred parts by weight of E–400–25, 22.5 parts by weight of diethyl phthalate, 0.75 parts by weight of di-tridecyl thiodipropionate, and 0.25 parts by weight of resorcinol bis-glycidyl ether were intimately blended on a calendering roll, cooled and chopped into pellets. The pellets were then extruded through a Brabender Plasti-corder at approximately 500° F., cooled and again chopped into pellets. Some of these pellets were re-extruded one time, some twice, and some three times to give a series of pellets of 1, 2, 3 and 4 extrusions. Plaques of approximately 5/32-in. thickness were formed from this series to give plaques designated A–1, A–2, A–3 and A–4, the numbers corresponding to the number of extrusions. All of the plaques were clear. The plaques were then secured with a clear adhesive to a piece of white cardboard. Black ink marks were made on the back of the cardboard and were clearly visible through each of the plaques.

EXAMPLE 9

An experiment essentialy identical to Example 8 was carried out except that dilauryl thiodipropionate was used in place of di-tridecyl thiodipropionate, and epoxidized soybean oil was used in place of resorcinol bis-glycidyl ether. The proportions of ingredients were the same as in Example 8. The plaques were designated B–1, B–2, B–3 and B–4 and mounted on cardboard marked as in Example 8. The ink mark was visible in B–1 but not as clearly so as in A–1. The ink mark in B–2 was barely visible, and was barely detectable in B–3 and B–4. All of the B plaques were hazy, B–2, B–3 and B–4 being substantialy opaque. Such haze did not occur in the A plaques.

EXAMPLE 10

An experiment similar to Example 9 was attempted using 2 parts of dilauryl thiodipropionate and 5 parts of epoxidized soybean oil. This composition would not blend on the calendering roll and could not be processed to plaques.

The above examples illustrate the marked effectiveness of the present stabilizer combination in achieving the objects of this invention.

Although the invention has been described in detail with particular reference to the preferred embodiments thereof, it will be understood that variations and modifications can be effected within the spirit and scope of the invention.

We claim:
1. The composition of matter comprising a cellulose ester plastic having improved color and I.V. stability when subjected to extensive heating, stabilized with the combination of from about 0.01 to about 1.0 parts by weight of each of di-tridecyl-3,3'-thiodipropionate and resorcinol bis-glycidyl ether.
2. The composition of claim 1 wherein each of the stabilizers is present in from about 0.1 to about 1.0 parts by weight.

References Cited

UNITED STATES PATENTS

| | | | |
|---|---|---|---|
| 2,602,785 | 7/1953 | Wiles | 260—30.4 EP |
| 2,739,160 | 3/1956 | McConnel | 260—348 R |
| 3,314,808 | 4/1967 | Moulds | 100—196 |

THEODORE MORRIS, Primary Examiner

U.S. Cl. X.R.

106—188, 189, 196